United States Patent [19]

Hanson

[11] 4,210,312

[45] Jul. 1, 1980

[54] VALVE USING FLEXIBLE ELEMENT

[75] Inventor: Geoffrey Hanson, Doncaster, England

[73] Assignee: Pegler Hattersley Limited, Doncaster, England

[21] Appl. No.: 887,744

[22] Filed: Mar. 15, 1978

Related U.S. Application Data

[63] Continuation-in-part of Ser. No. 750,881, Dec. 15, 1976, abandoned.

[30] Foreign Application Priority Data

Dec. 19, 1975 [GB] United Kingdom ............... 52204/75

[51] Int. Cl.² .......................................... F16K 31/524
[52] U.S. Cl. ..................................... 251/258; 251/304
[58] Field of Search ...................... 251/5, 6, 251, 257, 251/258, 304, 305, 306, 307, 308, 309, 368, 287, 288, 312, 315, 316, 317, 310

[56] References Cited

U.S. PATENT DOCUMENTS

| | | | |
|---|---|---|---|
| 2,534,577 | 12/1950 | Courtot | 251/258 |
| 2,812,154 | 11/1957 | Nordstrand | 251/251 |
| 2,948,504 | 8/1960 | Merrill | 251/258 |
| 2,961,006 | 11/1960 | Musser | 251/257 |
| 3,048,191 | 8/1962 | Crang | 251/317 |
| 3,087,507 | 4/1963 | Grant | 251/5 |
| 3,108,778 | 10/1963 | Rader | 251/308 |
| 3,195,573 | 7/1965 | Daumy | 251/257 |
| 3,802,462 | 4/1974 | Trosch | 251/61.1 |
| 3,993,099 | 11/1976 | Nightingale | 251/309 |

FOREIGN PATENT DOCUMENTS 929406 6/1955 Fed. Rep. of Germany ........... 251/304

Primary Examiner—Martin P. Schwadron
Assistant Examiner—G. L. Walton
Attorney, Agent, or Firm—Fleit & Jacobson

[57] ABSTRACT

A valve control element having a rotatable relatively rigid element in contact with a relatively flexible element and so arranged that relative movement between the two elements serves to cause a change in the contour of the flexible element thereby effecting a valve control function.

12 Claims, 11 Drawing Figures

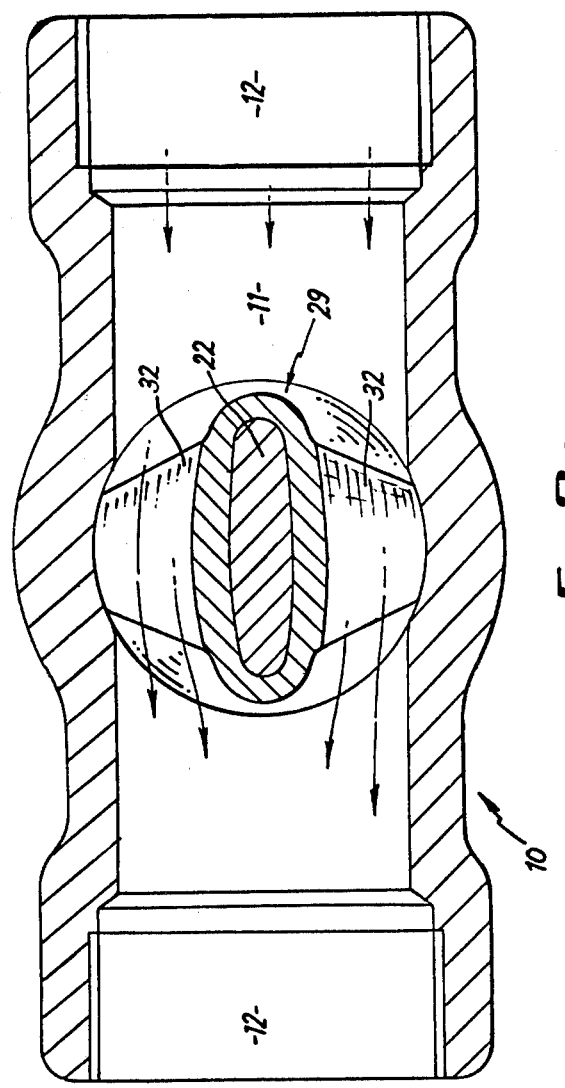

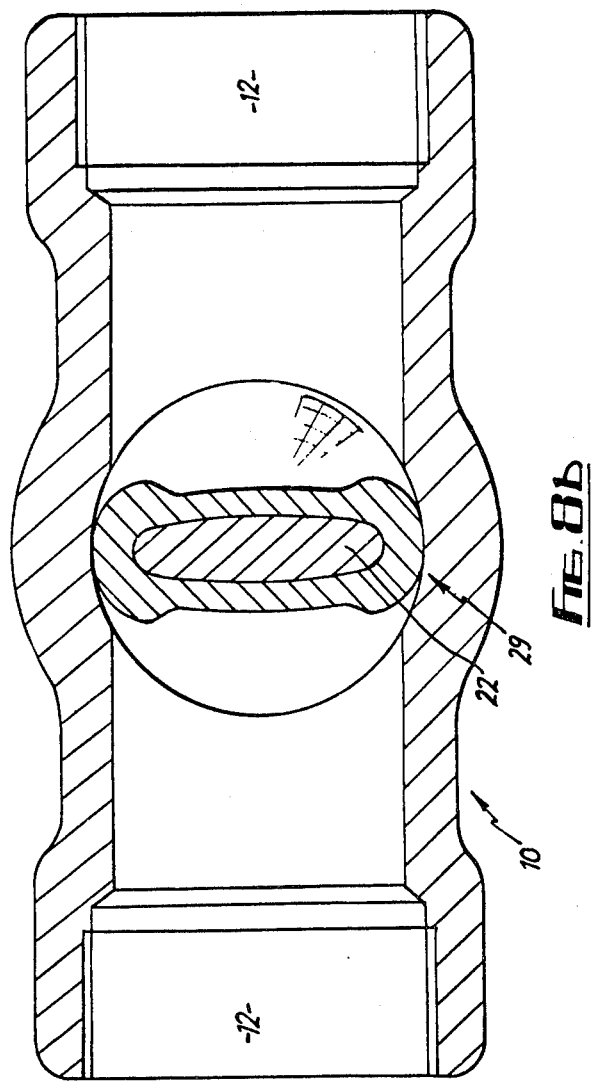

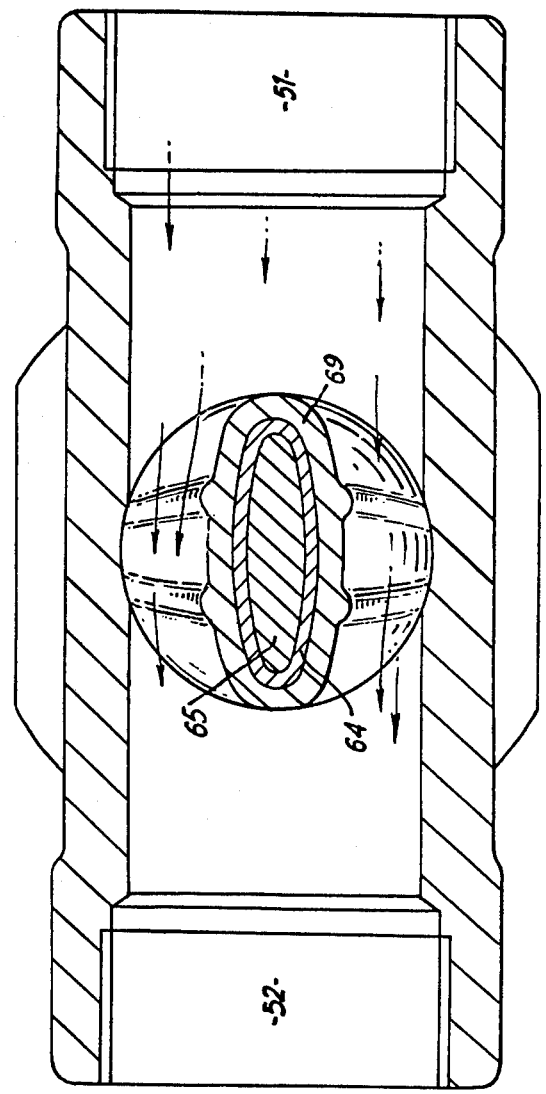

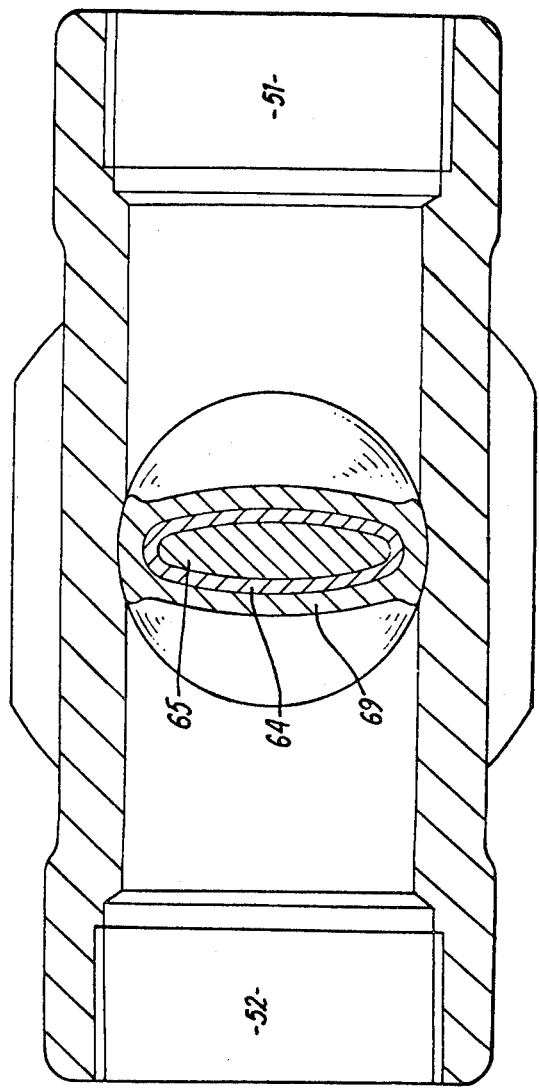

VALVE USING FLEXIBLE ELEMENT

CROSS-REFERENCE TO RELATED APPLICATION

This application is a continuation-in-part of U.S. patent application Ser. No. 750,881, filed Dec. 15, 1976, now abandoned.

BACKGROUND OF THE INVENTION

This invention concerns valves for use in industrial, office and domestic pipe installations. More particularly, this invention concerns valve control elements and valves. Thus the invention relates to, for example, sink taps, radiator valves, water works valves, chemical applications valves, food industry (hygienic) valves, drain valves, plug cocks and the like.

An object of the present invention is to provide a valve in which there are a minimal number of parts, and in which machining operations on the parts during manufacture of the valve are reduced, as compared to the machining operations currently required during valve manufacture.

Another object of the present invention is to provide a valve control element including a wholly supported elastomeric material seating member.

A further object of the present invention is to provide a glandless valve incorporating a control element of the kind above referred to.

SUMMARY OF THE INVENTION

Thus, according to one aspect of the present invention there is provided a valve control element comprising a first relatively rigid member and a second relatively flexible member incorporating seal producing formations thereon, said second member being in continuous resilient engagement with a continuous surface of the first member, the first member being so arranged that on relative movement between said members the contours of the flexible member are changed whereby a valve control function is effected.

Preferably, the first member is a relatively rigid core and the second member is a relatively flexible sleeve surrounding the core and in intimate resilient engagement with the surface of the core. Conveniently, the first and second members are of lenticular shape. The second member is preferably of elastomeric material.

Conveniently, each seal producing formation comprises a substantially diamond-shaped thickened region having a major axis extending lengthwise of the flexible member.

Alternatively, each seal producing formation may comprise a pair of spaced-apart ribs extending lengthwise of the flexible member. In a further alternative construction, the ribs are bowed and so positioned that the spacing therebetween is greatest in the central region of the flexible member.

According to a further aspect of the present invention, there is provided a valve including inlet and outlet ports, a flow passage therebetween and a seating member chamber extending across the flow passage, there being a valve control element of one of the types herein above referred to located within the seating member chamber.

Preferably, the relatively flexible member of the valve control element is secured against rotation in the seating member chamber.

BRIEF DESCRIPTION OF THE DRAWINGS

The invention will now be described further, by way of example only, with reference to the accompanying schematic illustrations in which:

FIGS. 8a and 8b are cross-sectional views taken along line VIII—VIII of FIG. 3 illustrating open and closed positions, respectively, of the valve of FIG. 1; and FIGS. 9a and 9b are cross-sectional views taken along line IX—IX of FIG. 6 illustrating open and closed positions, respectively, of the valve of FIG. 4.

DESCRIPTION OF THE PREFERRED EMBODIMENTS

Figure 1:
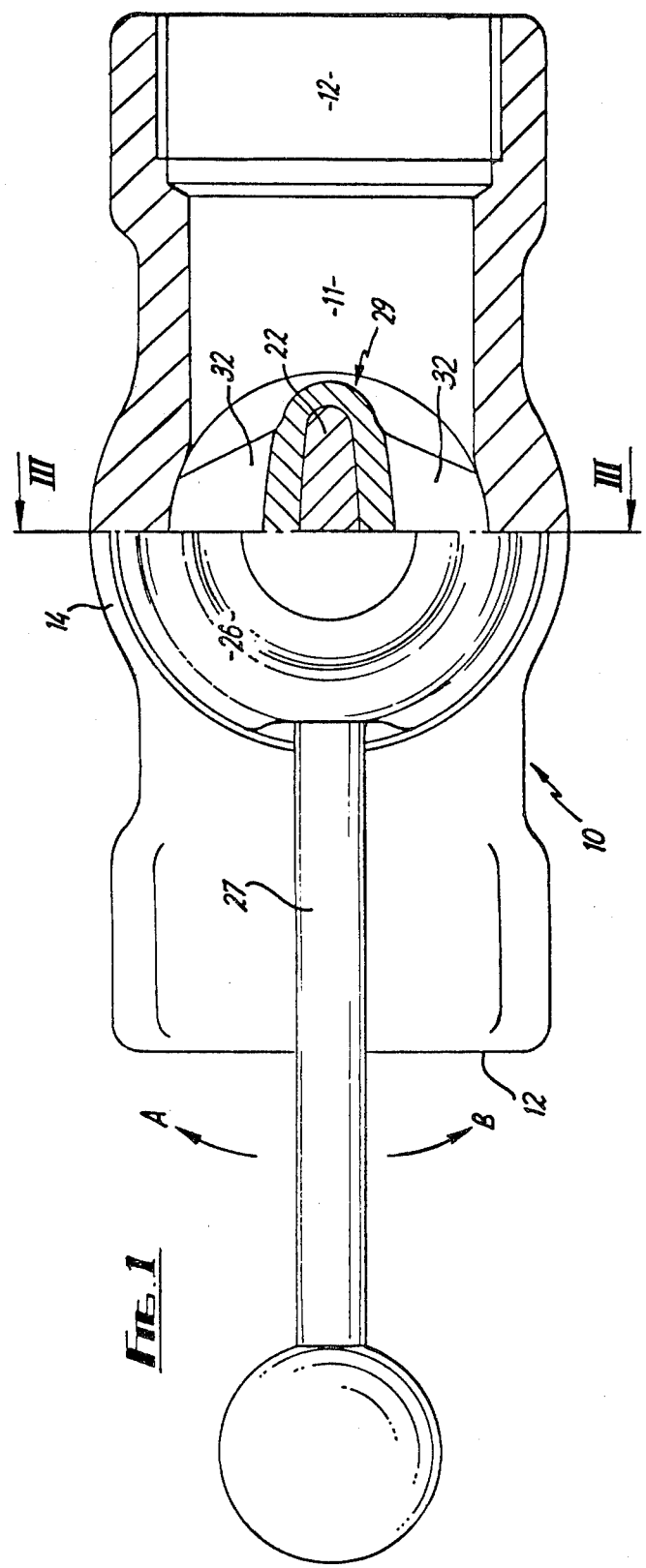
FIG. 1 is a part sectional elevation of one embodiment of a valve made in accordance with the invention.
Figure 2:
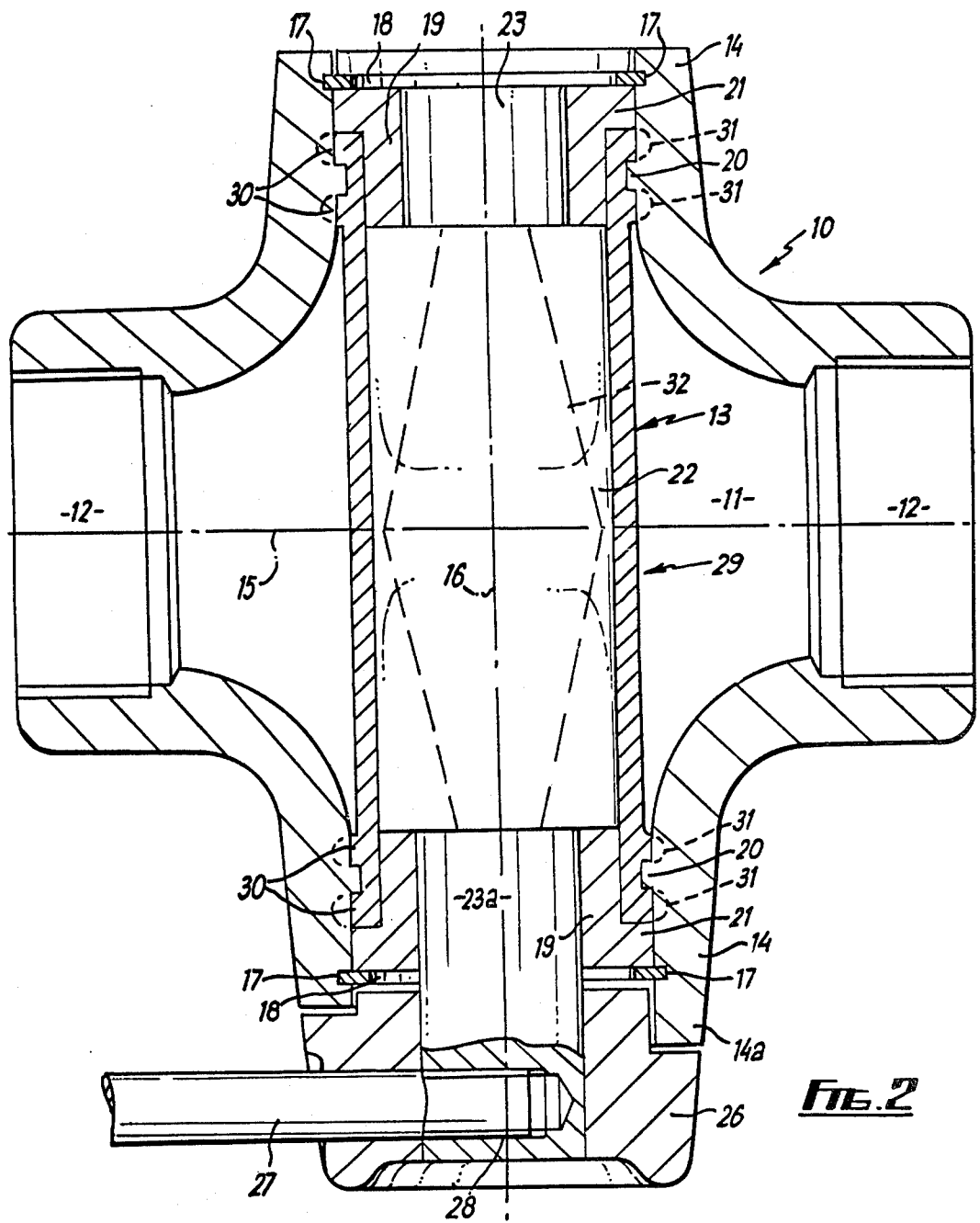
FIG. 2 is a part sectional plan view of the valve of FIG. 1.
Figure 3:
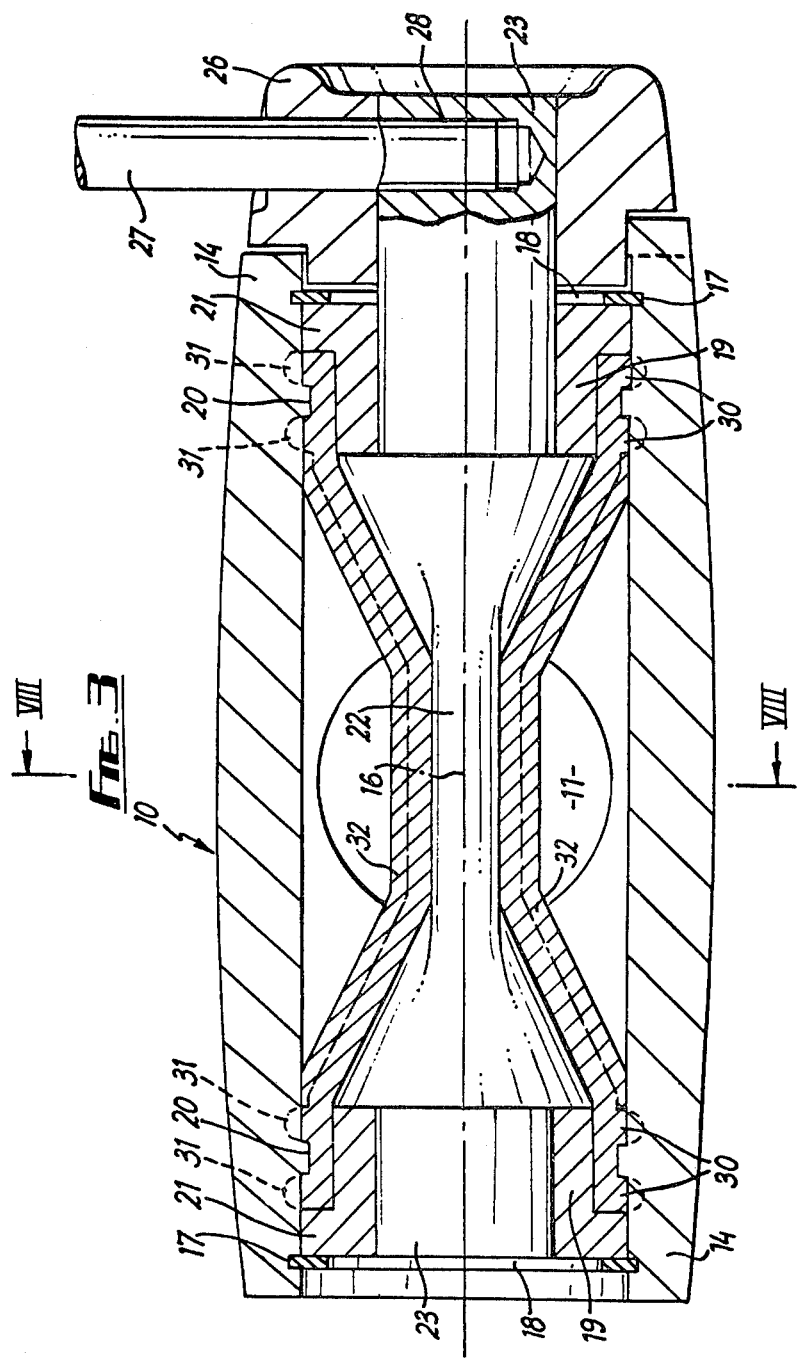
FIG. 3 is a section on the line III—III of FIG. 1.

Referring first to FIGS. 1 to 3 which illustrate one embodiment of a valve in accordance with the present invention in an open position, it will be seen that there is provided a body, generally designated 10, of generally cruciform shape (see FIG. 2 in particular) in which is formed a flow passage 11 which extends between a pair of aligned ports 12. Extending across the flow passage 11 is a valve controlling element, generally designated 13, the ends of which are contained within bosses 14. As can be seen particularly from FIG. 2, the axial center line 15 of the flow passage 11 is at right angles to the axial center line 16 of the valve controlling element 13. It is to be understood that it is possible to provide valves in which the axial center lines are not at 90° to each other. Inset from the outer extremities of each of the bosses 14 and around the inner periphery thereof is a groove 17 into which, when the valve is assembled, is located a circlip 18 which serves to retain a bearing bush 19. Inset from the groove 17 in each of the bosses 14 is an inwardly directed rib 20. In an alternative arrangement (to simplify manufacture of the body) the ribs 20 can be omitted. In this case a separate ring is, as described below, provided and used to perform the same function as the rib 20.

The bearing bushes 19 are each provided with an outwardly extending flange 21, the outermost face of which bears against the circlip 18 when the valve is assembled. The circlips 18 thus serve to retain the bushes 19 in position in the bosses 14.

The valve controlling element 13 has a relatively rigid core or core unit 22 of lenticular shape whose length is such that it extends between the bearing bushes 19 and thus across the flow passage 11. At the ends of the core unit 22 are bearings 23, 23a integral with the core unit 22. The only difference between the bearings 23, 23a in the valve illustrated lies in the fact that one bearing 23a is of greater axial length than the bearing 23. The longer bearing 23a extends, as can be seen from FIG. 2 through its bearing bush 19 and is provided with an end cap 26 which is drilled radially to allow the passage therethrough of an operating handle 27 which is screwed into a drilled and tapped radial hole 28 in the bearing 23a.

As can be seen from FIG. 2 in particular, the external diameter of the bearing bushes 19 is less than the internal diameter of the ribs 20 of the bosses 14 (or the separate rings referred to above). The space that exists between the bearing bushes 19 and the bosses 14 serves, as illustrated, to accommodate a relatively flexible element, generally designated 29, which surrounds the core unit 22 and is in intimate contact therewith over its entire surface. As illustrated, the element 29 is of greater length than the core unit 22 and thus extends between the inner edges of the flanges 21 of the bearings. The parts of the flexible element 29 which extend over the smaller diameter regions of the bearing bushes 19 are each provided with two spaced-apart external ribs 30, each of which is, in the relaxed condition preferably, although not essentially, of semi-circular cross section (as shown by the broken lines 31 on FIGS. 2 and 3). The ribs 30 are spaced-apart a distance equal to the width of the rib 20 and, when the valve is assembled, located one at each side of the rib 20 and are compressed to provide fluid tight seals between the flexible element 29 and the bosses 14. Compression of the ribs 30 also serves to ensure that the flexible element is non-rotatably secured in the valve body 10. In the alternative form, that is when the separate rings are provided, one ring would be located between the ribs 30 at each end of the flexible element 29 so that when the valve is assembled the rings serve the same purpose as the ribs 20 in that the ribs 30 of the flexible element can be compressed to form fluid tight seals. At diametrically opposed locations of the flexible element substantially diamond-shaped thickened regions 32 are provided externally of the element. The major axis of each of these thickened regions 32 is parallel to the axial center line of the valve controlling element 13 and, in the illustrated open position of the valve, the thickened regions are spaced from the valve body to allow fluid to flow through the passage between the ports 12. In FIG. 3, the thickened regions 32 are illustrated in cross section as a separate layer positioned on the outside of the portion of the flexible element 29 containing the ribs 30. It will be appreciated that the thickened regions can be formed integrally with or attached to the flexible element 29. Rotation of handle 27 through 90° in the direction of either arrow A or B (see FIG. 1) rotates the core and thus alters the contour of the flexible element 29 to cause the diamond-shaped thickened regions to press against the interior surface of the valve body 10 to close the valve. If desired, and as shown in FIG. 2, means can be provided to prevent rotation of the handle 27 through more than 90°. The means employed in this particular arrangement includes an extension of the length of boss 14, through which the bearing bush extends, over an arc of 90°. The extended length of the boss 14 is shown at 14a and the end cap is formed with a rib extending over 180°, and thus the arc of movement of the handle is, as stated above, restricted to 90° on either side of the neutral or open position of the handle.

Figure 4:
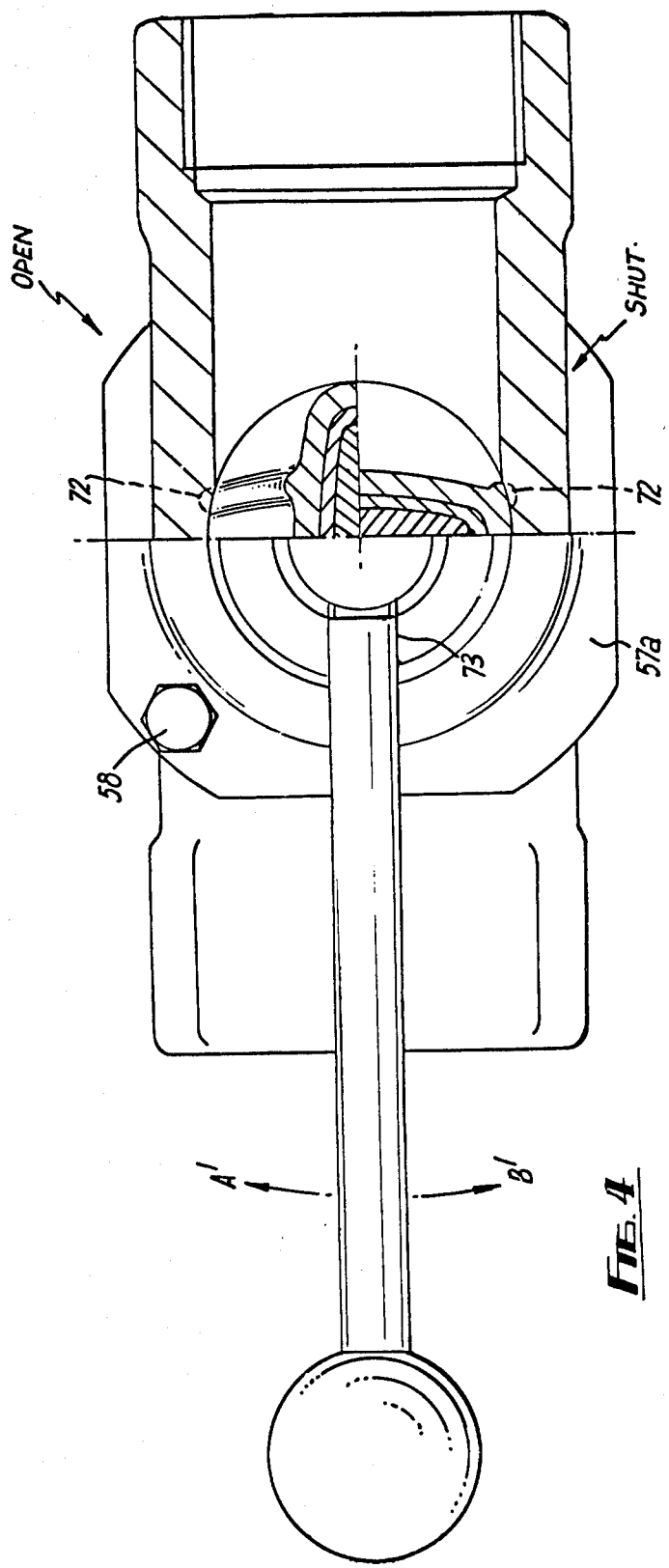
FIG. 4 is an illustration of another embodiment of a valve made in accordance with the present invention, with an upper part of the figure illustrating an open valve and a lower part of the figure illustrating a closed valve.
Figure 5:
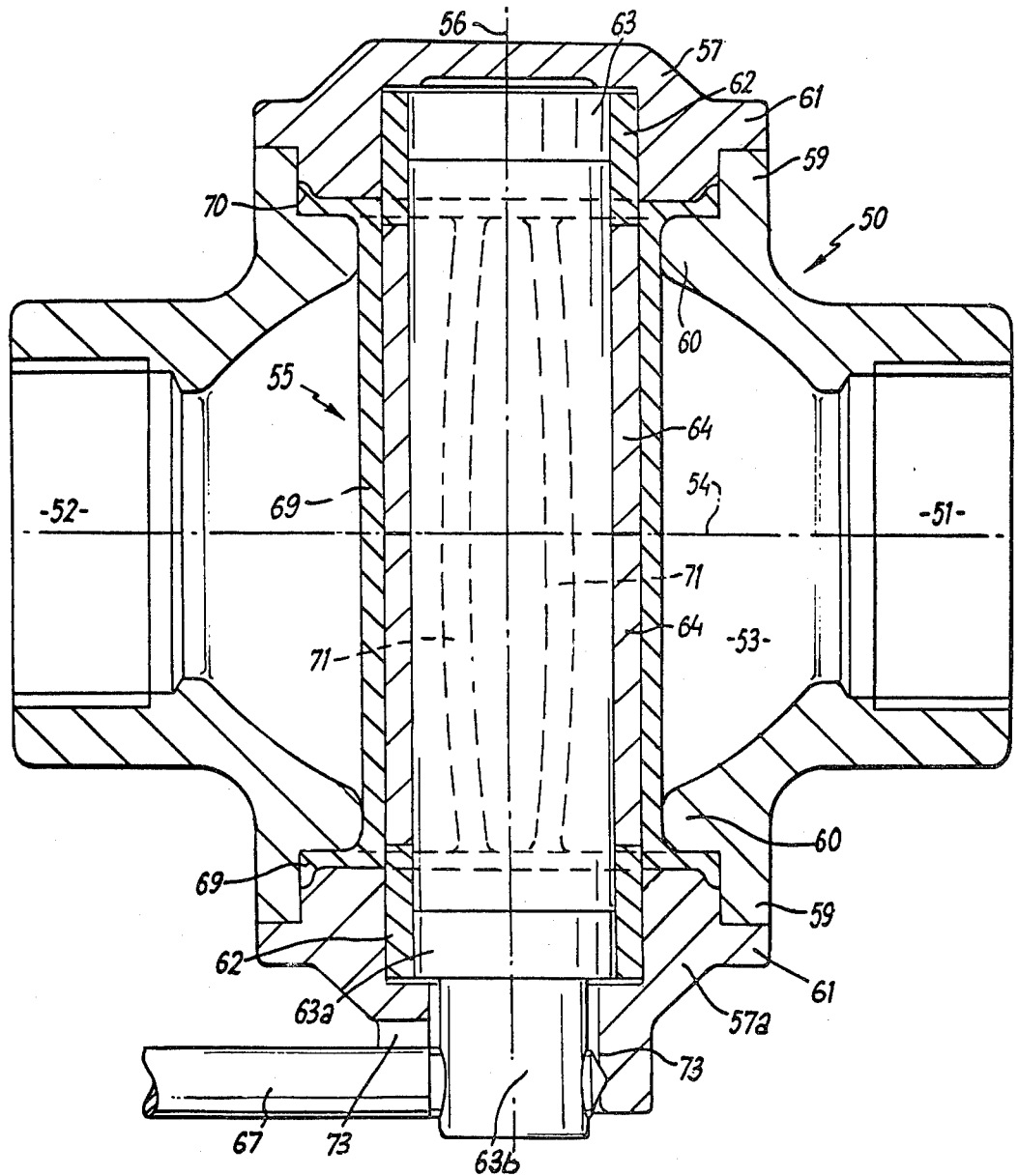
FIG. 5 is a part sectional plan view of the valve of FIG. 4.
Figure 6:
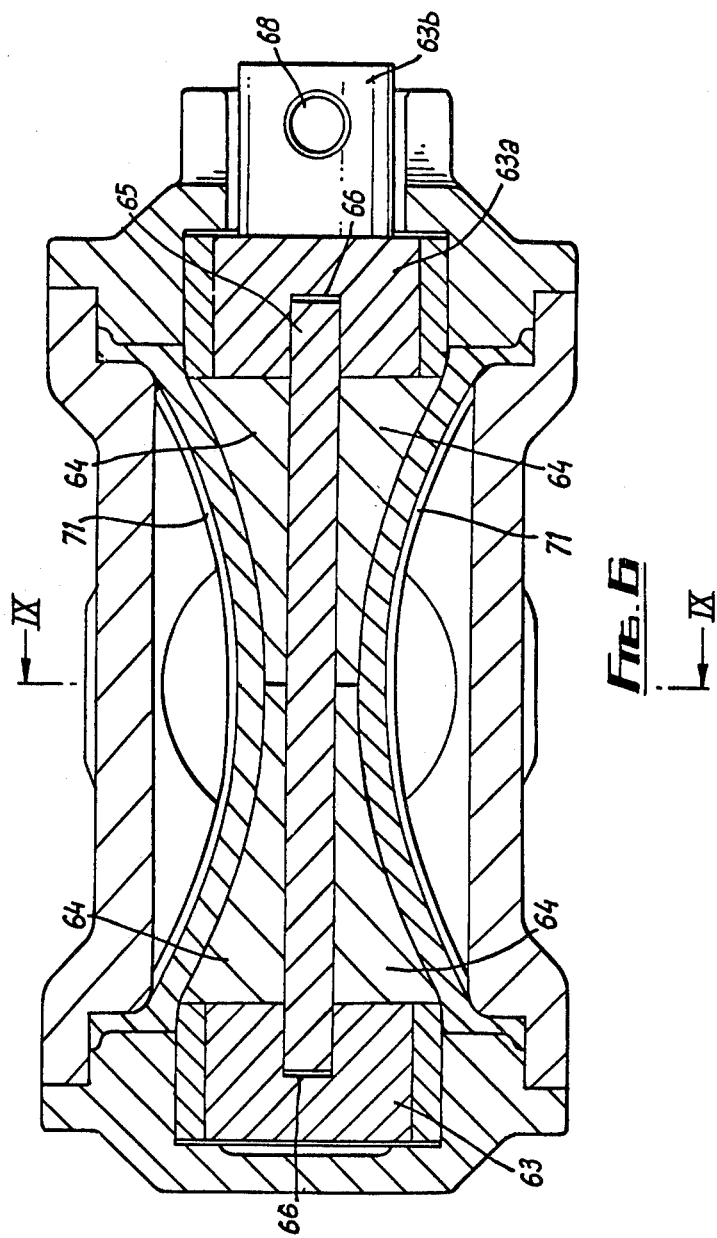
FIG. 6 is a section on the line VI—VI of FIG. 4.

Turning now to FIGS. 4, 5 and 6 which illustrate a modification of the valve of FIGS. 1 to 3, it will be seen that there is again provided a valve body, generally designated 50, of generally cruciform shape in cross section (see FIG. 5 in particular). As with the previously described embodiment, there are provided aligned ports 51 and 52 and a fluid passage 53. The axial center line of the flow passage 53 is indicated by the broken line 54. Extending across the flow passage 53 is a valve controlling element, generally designated 55, having an axial center line 56 which lies at right angles to the axial center line 54 of the flow passage 53. As in the embodiment of FIGS. 1 to 3 it is possible to have the axial center lines at an angle other than 90°. In this valve, the valve controlling element 55 is mounted in bearing members 57 and 57a which, as can be seen more particularly in FIG. 4, are secured by studs 58 on the ends of bosses 59 displaced 90° from the ports 51 and 52. As shown in FIGS. 5 and 6 in particular, the bosses 59 are provided with inwardly directed shoulders 60 inset from the ends of the bosses 59 and the bearing members 57 and 57a are flanged at 61 to seat on the ends of the bosses 59.

The bearing members 57, 57a extend inwardly of the ends of the bosses 59 to a position spaced from the outermost faces of the shoulders 60. Each bearing member is provided with an internal bearing bush 62 into which is located a bearing for a core assembly of the valve controlling element 55. The bearing element 57 has a blind bore in which the bush 62 is located, whereas the bearing member 57a has a stepped through bore, the bush 62 seating in the larger diameter portion of this bore which is innermost when the valve is assembled.

The valve controlling element 55 consists of a relatively rigid core and a flexible element surrounding the core. The relatively rigid core is adapted to be mounted in the bearing bushes by means of bearings 63, 63a which seat, respectively, in the bushes 62 of the bearing members 57 and 57a. The bearings 63, 63a are each provided with a slot 66 into which locates an end region of a carrier means 65 (see FIG. 6 in particular) on which are mounted elements 64 referred to below. In this arrangement, the elements 64 extend to the center of the carrier means 65 and have their ends in abutting relationship. The elements 64 are circular in cross section at their ends adjacent the bearings 63, 63a and their cross section vary along their length towards their inner ends, preferably to produce an overall lenticular shape. The bearing 63a is provided with an integral smaller diameter outwardly extending portion 63b which extends, when the valve is assembled, through the bearing member 57a and is there provided with a valve operating handle 67, the end of which is screwed into a drilled and tapped radial bore 68 in the extended portion 63b of the bearing 63a.

Surrounding the lenticular portion of the relatively rigid core and in intimate contact therewith is a flexible element and this comprises a body part 69 and an outwardly directed flange 70 at each end. The dimensions of the flexible element are such that it can be located in the space between the inner face of the bearing members 57, 57a and the outer faces of the shoulders 60 of the body of the valve. When the bearing members 57, 57a are secured in position by the studs 58, the flanges 70 are trapped and held securely in position to render the flexible element non-rotatable and to provide a fluid tight seal. The body 69 of the flexible element is provided at diametrically opposed positions with a pair of spaced-apart longitudinal ribs 71, the ribs of the pairs being either parallel to or outwardly bowed relative to the axial center line of the valve controlling element. The bowed form of the ribs 71 is shown in FIG. 5.

The core of the valve controlling member, when rotated, by the operating handle 67, relative to the non-rotatable flexible member serves to change the contour of the flexible member. Movement of the handle 67 through 90° will cause the valve to become fully opened from a fully closed position, or vice versa.

As can best be seen from FIG. 4, the valve controlling member when the valve is fully open, as shown in the upper part of the drawing, is positioned with the transverse axis of the carrier means 65 lying along the axial center line of the flow passage 53. The pairs of ribs 71 of the flexible element are thus spaced from the inner wall of the valve body 50. Rotation of the core of the valve controlling member to the position shown in the lower portion of FIG. 4, serves to alter the contour of the flexible element to cause the ribs 71 to press against the inner surface of the valve body 50 and, in fact, to become deformed somewhat to produce a fluid tight seal. In FIG. 4, the broken line 72 shows the form of the ribs in the fully relaxed condition and thus, it will be appreciated that a substantial deformation of the ribs 71 takes place when the valve is fully closed. The sealing of this valve is, it will be appreciated, pressure assisted on the upstream side of the valve since pressure fluid at this side of the valve will tend to push the deformed rib towards the inner surface of the valve body 50.

As in the embodiment of the valve illustrated in FIGS. 1 to 3, the valve controlling element requires only 90° of movement in the direction of Arrows A' or B' between a valve open and a valve closed position. Since FIG. 4 shows both an open and a closed valve, movement of lever 67 in the direction of Arrow B' is not possible in the illustrated embodiment because stop means 73 formed by a raised abutment or surface limit movement of the operating lever 67 in this direction.

Figure 7:
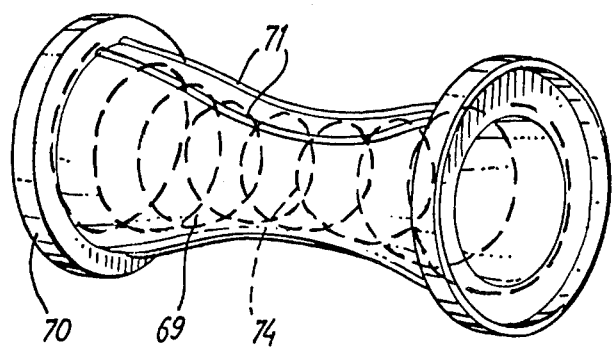
FIG. 7 is a perspective view of part of the valve of FIG. 4 showing a further modification.

FIG. 7 illustrates schematically a modification of the flexible member 69 of the valve of FIGS. 4, 5 and 6. The modification utilizes embedding within the flexible member of a spirally wound reinforcing means 74, which extends either in predetermined portions or along the whole length of the member 69 and terminates in the flanges 70. The means 74 may be in the form of a textile yarn or cord which serves to increase the strength of the member 69 circumferentially to a greater extent than axially and to counteract any tendency of the member 69 to separate from the core thereby to create a void.

It will be appreciated that the features of the valve described in relation to FIGS. 1 to 3 and 4 to 6 are separately or collectively interchangeable.

Clearly the valves can be provided with handwheels for opening and closing, if desired. In addition the spiral reinforcement shown in FIG. 7 and described in relation to the flexible element of the valve of FIGS. 4 to 6 can be provided in the flexible element described in relation to the valve of FIGS. 1 to 3.

The invention is also applicable to valves in which the ports are not in alignment and to valves having more than two ports.

Valves made in accordance with the embodiments of the invention described above have many advantages. Since an elastomeric seating member is used, tight closure and sealing of the valve can be achieved with the surface against which it seats, despite slight imperfections in the surface of either the seating member or the seat. Thus, by using elastomeric material for the seating member, machining of the seat need not be so accurate as is required for the production of a seat for a rigid valve closure element. In addition, the valve can be used in pipework or systems in which dirty fluids are to be handled. The valve is especially useful in pipework or systems in which powders and slurries are handled since the seating member, having a relatively high degree of resilience as compared to a metallic seating member, will not be scored or otherwise adversely affected by the impingement thereon of particles, granules or the like in the material being handled.

A further advantage of glandless valves as described above lies in the fact that the valve closure chamber is totally isolated from the atmosphere, and thus the risk of pollution is eliminated. In addition, since the valve closure element is completely supported against pressure, the range of polymeric materials that can be used for the closure member is almost unlimited which gives the designer the ability to choose the material most compatible with the operating conditions under which the valve will be used.

The fact that the valve closure can move from a fully open to a fully closed position in one quarter of a turn means that the valve can be operated quickly. Moreover, between the fully closed and fully open positions, the valve is capable of adjustment. This feature provides for flow regulation.

Valves of the kind described above can be used in any orientation and, in the case in which the valve closure chamber is horizontally disposed, the valve is completely self draining. The interior surfaces of the valve can, if desired, be lined to produce a hygienic valve and, if desired, the whole valve, for some uses, can be made from plastics material.

It will be readily appreciated by those skilled in the art that the embodiments and modifications of the invention described herein are illustrative of the present invention. Other embodiments and modifications will be apparent and are intended to be covered by the following claims.

What is claimed is:

1. A valve comprising:
   (a) a valve housing having portions defining an inlet, an outlet, and a passageway connecting the inlet and the outlet;
   (b) a control member positioned in said passageway for movement between a first position in which fluid is able to flow through said passageway and a second position in which said control member blocks fluid flow through said passageway, said control member comprising:
     (1) a first relatively rigid member having interconnected continuous opposed surfaces, and
     (2) a second relatively flexible member having portions thereof in continuous resilient engagement with the continuous opposed surfaces of said first member, the continuously engaged portions of said second member including generally diamond-shaped reinforced portions positioned in such manner that the width of the reinforced portions is greatest in the vicinity of a central portion of the second member and decreases from the central portion towards each end of the second member, said first member being so positioned in said passageway that movement of said control member from said first to said second position moves said first member thereby changing the contour of said second member and urging the reinforced portions of said second member into engagement with portions of said housing defining said passageway; and (c) means connected to said first member of said control member for moving said control member between said first and said second positions so that said control member performs a valve control function.

2. A valve as claimed in claim 1 wherein said first member is a relatively rigid core and said second member is a relatively flexible member surrounding said core and in intimate resilient engagement with the core surface.

3. A valve as claimed in claim 1 wherein said first and second members are of lenticular shape.

4. A valve as claimed in claims 1 or 2 wherein the first member includes a pair of elements adapted to receive therebetween a flat bar element.

5. A valve as claimed in claim 1 wherein said valve housing includes another portion defining a second passageway intersecting and extending transversely to the passageway connecting the inlet and the outlet, said second passageway being open at both ends, said another portion including inwardly extending radial ribs spaced from each end of said second passageway, said control member being positioned in said second passageway and having end portions of said second member contacting said another portion of said valve housing on both sides of each of said ribs, said valve further comprising flange means engageable with said another portion of said valve housing and said end portions of said second member in such manner that a fluid tight seal is formed between said end portions of said second member and said another portion of said valve housing and in such manner that said end portions of said second member are secured, against movement, to said another portion.

6. A valve as claimed in claim 5 wherein said second member is reinforced so that its strength is greater circumferentially than axially.

7. A valve comprising:
(a) a valve housing having portions defining an inlet, an outlet, and a passageway connecting the inlet and the outlet;
(b) a control member positioned in said passageway for movement between a first position in which fluid is able to flow through said passageway and a second position in which said control member blocks fluid flow through said passageway, said control member comprising:
  (1) a first relatively rigid member having interconnected continuous opposed surfaces, and
  (2) a second relatively flexible member extending in an axial direction and having portions thereof in continuous resilient engagement with the continuous opposed surfaces of said first member, each of the continuously engaged portions of said second member including a pair of spaced apart reinforcing ribs extending generally in the axial direction of said second member, said first member being so positioned in said passageway that movement of said control member from said first to said second position moves said first member thereby changing the contour of said second member and urging the reinforcing ribs of said second member into engagement with portions of said housing defining said passageway; and (c) means connected to said first member of said control member for moving said control member between said first and said second positions so that said control member performs a valve control function.

8. A valve as claimed in claim 7 wherein said first member is a relatively rigid core and said second member is a relatively flexible member surrounding said core and in intimate resilient engagement with the core surface.

9. A valve as claim in claims 7 or 8 wherein said first and second members are of lenticular shape.

10. A valve as claimed in claims 7 or 8 wherein the first member includes a pair of elements adapted to receive therebetween a flat bar element.

11. A valve as claimed in claim 7 wherein said second member includes interconnected axially extending side walls and flange members extending outwardly from the ends of said side walls, wherein said valve housing includes another portion defining a second passageway intersecting and extending transversely to the passageway connecting the inlet and the outlet, said second passageway being opened at both ends, said another portion including shoulder members spaced from each end of said second passageway, each of said shoulder members having first portions defining a bore and second portions spaced between said first portions and the ends of said second passageway, said control member being positioned in said second passageway with the side walls of the second member contacting the bore defined by said first portions of said shoulder members and the flange members contacting the second portions of said shoulder members, and wherein said valve further comprises flange means engageable with said another portion of said valve housing and said flange members of said second member in such manner that a fluid tight seal is formed between said flange members and said another portion of said valve housing and in such manner that said flange members of said second member are secured, against movement, to said another portion.

12. A valve as claimed in claim 11 wherein said second member is reinforced so that its strength is greater circumferentially than axially.

* * * * *